Patented Feb. 7, 1933

1,896,710

UNITED STATES PATENT OFFICE

WERNER LANGE, OF DESSAU-ZIEBIGK IN ANHALT, GERMANY, ASSIGNOR TO GENERAL ANILINE WORKS, INC., OF NEW YORK, N. Y., A CORPORATION OF DELAWARE

AZO DYES

No Drawing. Application filed December 15, 1931, Serial No. 581,265, and in Germany May 30, 1930.

My present invention relates to a process for manufacturing azo dyes and to the new products obtainable according to this process.

I have found that 4-nitro-1.3-diaminobenzene may be diazotized to form a monodiazo compound and that the latter may be coupled with any azo component in an acid, neutral or alkaline medium under formation of azo dyes. This fact is surprising, since 1.3-diamines otherwise, when treated with nitrous acid yield brown dyes of the Bismarck-brown type.

The azo dyes obtainable according to my invention may be further diazotized either in substance or on the fiber and coupled with azo components. The monoazo dyes containing sulfonic acid radicles, dye wool or leather or other animal fibers from an acid dyeing bath, while such dyes containing a greater number of azo groups substantively dye cotton. The monoazo dyes containing no sulfonic acid radicles serve as pigments or fat dyes; alternatively, they may be used for dyeing acetyl cellulose and the products made thereof. They, too, may be diazotized on the fiber and coupled with further azo components.

The following examples serve to illustrate my invention, the parts being by weight:—

*Example 1.*—15.3 parts of 1.3-diamino-4-nitrobenzene are dissolved in 75 parts of hot water and 25 parts of concentrated hydrochloric acid. The hot solution obtained is poured into 800 parts of a mixture of water and ice, the bulk of the hydrochloride being separated in a finely divided form. By addition of a solution of 6.9 parts of sodium nitrite and by stirring the monodiazo compound is formed. Then an aqueous solution of 21 parts of sodium N-methylaniline-ω-sulfonate is added simultaneously with such a quantity of sodium acetate that the reaction of hydrochloric acid disappears, and the reaction mixture is stirred for some hours. Then the acetic acid is nearly neutralized by addition of sodium carbonate and stirring is continued until the diazo compound is no longer detectable. The dye is saponified by warming for half an hour in a solution of sodium hydroxide of 2 per cent strength, and is separated from the liquid in the usual manner. In the dry state it forms a brown powder which is soluble in fats and hydrocarbons with yellow color. From an aqueous suspension acetyl cellulose is dyed in clear and fast orange shades. When diazotized on the fiber and coupled with 2-hydroxynaphthalene-3-carboxylic acid, this shade becomes violet-black.

When substituting the aniline derivative, mentioned above, by 1-methyl-3-amino-4-methoxybenzene, a dye is obtainable which dissolves in fats with orange color and which dyes acetyl cellulose red shades.

*Example 2.*—The diazo compound prepared according to Example 1, is united with a solution of 14.9 parts of diethyl aniline, acid by the presence of hydrochloric acid; by gradual addition of sodium acetate the acid reaction of the mixture is partially neutralized, and the mixture is stirred until the diazo compound is no longer detectable. The dye is separated in the usual manner. In the dry state, it forms a yellow brown powder soluble in fats and hydrocarbons with yellow color and dyeing acetyl cellulose from an aqueous suspension fast red shades. When diazotized on the fiber and treated with 2 - hydroxy - naphthalene - 3 - carboxylic acid, this dyeing becomes orange brown.

*Example 3.*—The diazo compound of 1.3-diamino-4-nitrobenzene prepared according to Example 1, is allowed to run, while stirring and cooling, in a solution of 10.8 parts of 1-methyl-4-hydroxybenzene and 4 parts of sodium hydroxide in the presence of an excess of sodium carbonate. When coupling is complete, the mixture is warmed and the precipitated dye is separated from the liquid. It forms in the dry state a reddish brown powder which is soluble in fats and hydrocarbons with green yellow color and which from an aqueous suspension dyes acetyl cellulose green yellow tints.

*Example 4.*—To the monoazo compound obtainable according to Example 1, a solution of 14.7 parts of 1-aminonaphthalene, acid by the presence of hydrochloric acid, is added and the mixture is stirred for some hours until the diazo compound has disappeared. The insoluble dye formed is separated from the liquid. In the dry state it forms a black powder soluble in fats and hydrocarbons with a Bordeaux color and dyeing acetyl cellulose fast red tints which become violet black by diazotizing and developing with 2-hydroxy-3-carboxylic acid.

When substituting 1-ethylaminonaphthalene for 1-aminonaphthalene, one obtains a dye dyeing acetyl cellulose bright brown tints, while substitution by 2-aminonaphthalene leads to a reddish brown tint.

*Example 5.*—The monodiazo compound obtainable according to Example 1 is allowed to run while cooling in an aqueous solution of 30.4 parts of 2-hydroxynaphthalene-3.6-disulfonic acid, held alkaline by addition of sodium carbonate. When the coupling has finished, the dye is separated by addition of common salt. In the dry state it forms a brown black powder which dyes wool orange brown tints from an acid dyeing bath.

*Example 6.*—To the diazo compound prepared according to Example 1, an aqueous suspension of 31.9 parts of 2-amino-8-hydroxynaphthalene-3.6-disulfonic acid is added simultaneously with such a quantity of sodium acetate that the reaction of hydrochloric acid disappears. The mixture is stirred for some hours. When coupling is complete, sodium carbonate is added and the dye is separated by common salt. It forms in the dry state a black powder which dyes wool Bordeaux tints in an acid dyeing bath.

*Example 7.*—31.9 parts of 1-amino-8-hydroxynaphthalene-3.6-disulfonic acid are diazotized in the usual manner. The diazo compound is allowed to run while cooling into a solution of 11 parts of resorcinol kept alkaline by the presence of an excess of sodium hydroxide. Then 30.6 parts of 1.3-diamino-4-nitrobenzene are monodiazotized in an analogous manner as described in Example 1. The monodiazo compound thus obtained is added to the hereinbefore described reaction mixture containing the monoazo dye, while adding such a quantity of sodium carbonate that after complete addition of the diazo compound the mixture shows an alkaline reaction. The dye is worked up in the usual manner and separated from the liquid by addition of salt. In the dry state it forms a dark brown to black powder which dyes leather bright brown tints.

Probably it corresponds to the following formula:

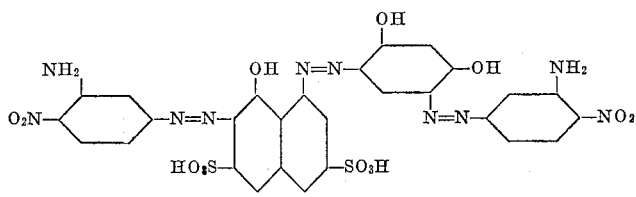

A similar dye is obtainable when substituting 1-amino-8-hydroxynaphthalene-4.6-disulfonic acid for the corresponding 3.6-disulfonic acid mentioned above.

*Example 8.*—The monoazo dye obtainable according to Example 7 from 1-amino-8-hydroxynaphthalene-3.6- or 4.6-disulfonic acid and resorcinol, in a first stage is coupled, in an alkaline medium, with the diazo compound obtained from 13.8 parts of para- or meta-mononitroaminobenzene. To the reaction mixture then the diazo compound is added, obtainable under the conditions mentioned in Example 1, from 15.3 parts of 1.3-diamino-4-nitrobenzene, the reaction mixture being still kept alkaline. The dye worked up in the usual manner, is similar to that described in Example 7; it dyes leather somewhat redder tints.

In the case of meta-mononitroaminobenzene it probably corresponds to the following formula:

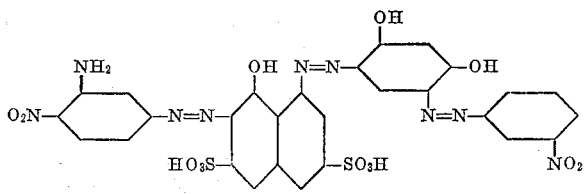

*Example 9.*—15.3 parts of 1.3-diamino-4-nitrobenzene are diazotized as indicated in Example 1. 15.4 parts of 3.5-dihydroxybenzene-1-carboxylic acid are dissolved, together with 5.3 parts of sodium carbonate, in 500 parts of water. The diazo compound is allowed to run while stirring and cooling into the solution of resorcylic acid while keeping alkaline the mixture by addition of an excess of soda. The dye obtained is worked up in the usual manner. It dyes leather clear yellow brown tints.

*Example 10.*—The diazo compound of 15.3 parts of 1.3-diamino-4-nitrobenzene obtained in the manner mentioned above, is added, while cooling, to a solution of 25.4 parts of 4′-sulfophenyl-3-methyl-5-pyrazolone, kept alkaline by the presence of sodium carbonate. The dye separated in the usual manner dyes wool reddish yellow tints having a good fastness to light.

*Example 11.*—The diazo compound of 15.3 parts of 1.3-diamino-4-nitrobenzene obtainable according to Example 1, is added to a solution of 15.3 parts of 1.3-diamino-4-nitrobenzene in dilute hydrochloric acid, whereat the hydrochloric acid is neutralized by addition of sodium acetate. The dye worked up in the usual manner dyes acetate silk yellow tints.

The same dye is obtainable when diazotizing a solution of two molecular proportions of 1.3-diamino-4-nitrobenzene in the presence of hydrochloric acid with one molecular proportion of sodium nitrite followed by addition of a solution of sodium acetate.

In the foregoing examples I have given a number of possibilities how the monodiazo compound of 4-nitro-1.3-diaminobenzene may be used for the manufacture of azo dyes by coupling it with azo components of different kind. However, my invention is not limited to these components of the benzene, naphthalene or pyrazolone series and other valuable dyes are likewise obtainable with other substitution products of these compounds or with, for instance, dihydroxyquinoline, aceto acetic acid anilides and similar compounds well known in the art.

What I claim is:—

1. The process which comprises monodiazotizing 4-nitro-1.3-diaminobenzene and coupling the monodiazo compound with an azo component.

2. The process which comprises monodiazotizing 4-nitro-1.3-diaminobenzene and coupling the monodiazo compound with an azo component of the group consisting of amino, hydroxy- and aminohydroxy compounds of the naphthalene and the benzene series.

3. The process which comprises monodiazotizing 4-nitro-1.3-diaminobenzene and coupling the monodiazo compound with an azo component of the group consisting of sulfonic acids of amino, hydroxy- and aminohydroxy compounds of the naphthalene and the benzene series.

4. The process which comprises monodiazotizing 4-nitro-1.3-diaminobenzene and coupling the monodiazo compound with a hyroxyazo dye capable of reacting with a diazo compound.

5. The process which comprises monodiazotizing 4-nitro-1.3-diaminobenzene and coupling the monodiazo compound with 8-hydroxynaphthalenedisulfonic acid-1-azo-resorcinol in an alkaline medium.

6. The process which comprises monodiazotizing two molecular proportions of 4-nitro-1.3-diaminobenzene and coupling the monodiazo compound with one molecular proportion of 8-hydroxynaphthalenedisulfonic acid-1-azo-resorcinol in an alkaline medium.

7. The process which comprises monodiazotizing 4-nitro-1.3-diaminobenzene and coupling the monodiazo compound with 8-hydroxynaphthalene-3.6-disulfonic acid-1-azo-resorcinol in an alkaline medium.

8. The process which comprises monodiazotizing two molecular proportions of 4-nitro-1.3-diaminobenzene and coupling the monodiazo compound with one molecular proportion of 8-hydroxynaphthalene-3.6-disulfonic acid-1-azo-resorcinol in an alkaline medium.

9. The azo dyes corresponding to the general formula:

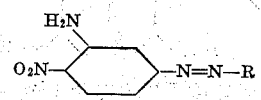

wherein R means the radicle of an azo component.

10. The azo dyes corresponding to the general formula

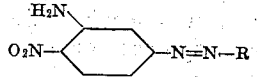

wherein R means the radicle of an azo component of the benzene or naphthalene series.

11. The azo dyes corresponding to the general formula

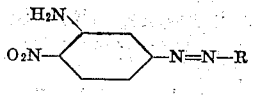

wherein R means the radicle of an azo component of the benzene or naphthalene series bearing a sulfonic acid group.

12. The azo dyes corresponding to the general formula

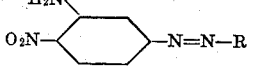

wherein R means the radicle of a hydroxyazo dye.

13. The azo dyes corresponding to the general formula

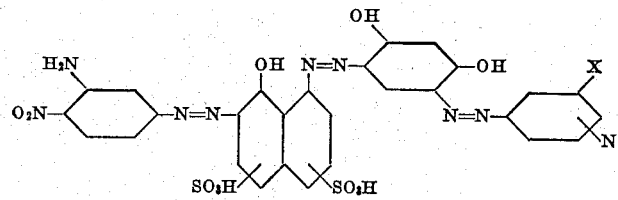

wherein X means hydrogen or NH₂, said dyes being in the dry state brown to black powders, soluble in water and dyeing leather clear brown tints.

14. The azo dyes corresponding to the general formula

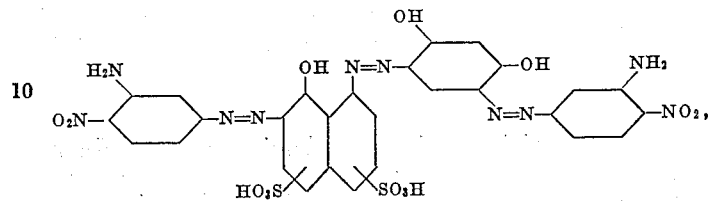

said dyes being in the dry state brown to black powders, soluble in water and dyeing leather clear brown tints.

15. The azo dye corresponding the formula

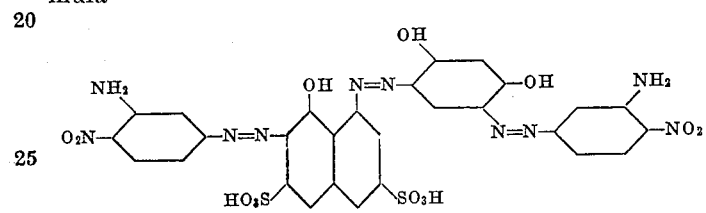

said dye being in the dry state a dark brown powder soluble in water and dyeing leather clear brown tints.

16. The process which comprises monodiazotizing 4-nitro-1.3-diaminobenzene and coupling the monodiazo compound with 3.5-dihydroxybenzene-1-carboxylic acid.

17. The azo dye corresponding to the formula

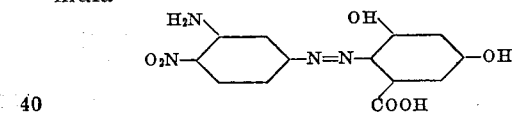

being in the dry state a dark powder, soluble in water and dyeing leather clear yellow brown tints.

In testimony whereof, I affix my signature.
WERNER LANGE.